United States Patent Office

Re. 28,270
Reissued Dec. 10, 1974

28,270

PREPARATION OF MANGANESE BISMUTH

Di Chen and Roger W. Honebrink, Minnetonka, Gary N. Otto, Mayer, and Jack A. Sartell, Minnetonka, Minn., assignors to Honeywell Inc., Minneapolis, Minn.

No Drawing. Original No. 3,539,383, dated Nov. 10, 1970, Ser. No. 690,388, Dec. 14, 1967. Application for reissue May 2, 1973, Ser. No. 356,654
C23c *13/02;* H01f *41/14*
U.S. Cl. 117—240 8 Claims

Matter enclosed in heavy brackets [ ] appears in the original patent but forms no part of this reissue specification; matter printed in italics indicates the additions made by reissue.

ABSTRACT OF THE DISCLOSURE

A process for preparing manganese bismuth films is described. The process modifies the known vacuum deposition process primarily by depositing bismuth first then manganese on a substrate. A preferred initial ratio of manganese to bismuth is disclosed for obtaining improved magneto-optic properties.

BACKGROUND OF THE INVENTION

A film of a magneto-optically active material can be oriented by a magnetic field. If a beam of linearly polarized light is incident on the film, the plane of polarization of the light is rotated. The effect appears in both reflected and transmitted light. The Kerr effect refers to the rotation of the polarization vector in the reflected beam and the Faraday effect refers to that in the transmitted beam. If the magnetization of a region of the magnetized film is reversed, the effect on the polarization of light is also reversed. Thus, light reflected from or transmitted through this region has a polarization different from the polarization of the light reflected from or transmitted through the surrounding areas which retain the original magnetization. If the magnetization of various increments of area are arranged in such a manner as to represent information stored on the film, the varying state of the polarization provides an approach for optical readout of the information. It is therefore obvious that magneto-optic materials are generally desirable materials for magneto-optic information storage. Manganese bismuth is a promising magneto-optic material. This compound exhibits an unusually large polarization rotation and a convenient Curie temperature range.

A technique for perparing manganese bismuth films has been described by Williams, Sherwood, Foster and Kelley in their article entitled "Magnetic Writing on Thin Films of MnBi," Journal of Applied Physics, vol. 28, page 1181 (1957). In their method, a layer of manganese and then a layer of bismuth is evaporated onto a glass substrate. The substrate is then placed in a Pyrex tube, preheated during evacuation and baked at 225–350° C. for three days. Some of the resultant films are found to be highly oriented with the crystalline C-axis perpendicular to the substrate surface. Subsequently, Mayer in his article entitled "Nucleation Experiments on Thin Magnetic MnBi Films." Journal of Applied Physics, vol. 31, page 3845 (1960) found that the nucleation process is not controllable in the Williams et al. procedure. As a result, the films are not reproducible and it is difficult to obtain films of a large surface area. Furthermore, since these films are polycrystalline and not single crystal, they have a number of undesirable features from a practical standpoint.

SUMMARY OF THE INVENTION

Films prepared in accordance with this invention, on the other hand, are substantially reproducible, may be essentially single crystal if desired and possess improved magnetic, optical and magneto-optic properties.

The process of the invention is preferably accomplished by means of vapor deposition in a vacuum, a technique which is familiar to those of ordinary skill in the art. Reference is made to the book "Vacuum Deposition of Thin Films" by L. Holland, Wiley Publishers, New York (1956) for a comprehensive teaching concerning routine deposition procedures as preferred by this invention. Other deposition techniques, such as ion sputtering or chemical deposition, may be used. However, since vapor deposition is preferred, the invention will be described primarily in that context.

In general, vapor deposition is accomplished by providing separate sources of manganese and bismuth in a vacuum environment. A substrate for deposition is also provided in the environment. Each source is individually heated to a vaporization temperature while the substrate is maintained at a relatively low temperature whereby the evaporated vapors deposit thereon.

The invention is particularly characterized in its broadest sense by the fact that intermetallic manganese bismuth is prepared by first depositing an amount of bismuth on the substrate. Following the bismuth deposition, an amount of manganese is deposited over the bismuth. Upon completion of the deposition of the binary constituents, they are heated at a suitable temperature for a time sufficient to form the manganese bismuth compound.

DESCRIPTION OF THE PREFERRED EMBODIMENTS

It is critical to this invention that the bismuth be deposited on the substrate first followed by the deposition of the manganese over the bismuth. Otherwise, the desired amounts of the binary constituents placed on the substrate are not always retained thereon during the heat treatment. The haphazard loss of varying amounts of the constituents during the heat treatment seriously affects the reproducibility of the resultant product. Such a procedure must also be followed if the epitaxial single crystal form is desired since stoichiometry is important in this regard.

Since separate sources of the binary constituents must be used for deposition, consideration must also be given to the relative initial amounts of the sources provided for evaporation and subsequent deposition on the substrate if it is desired to attain a controlled stochiometric relationship for the formation of the manganese bismuth compound. Control of stoichiometry has been found to provide improved optical properties in the films prepared in accordance with this process.

Manganese bismuth has two manganese ions and two bismuth ions within a unit cell of the crystal. Therefore, a stoichiometric sample of 1:1 atomic ratio is desired for an easily reproducible compound or for single crystal compounds. The corresponding mass or weight ratio of manganese to bismuth is 1:3.8. In experimental studies of the growth parameters of manganese bismuth obtained by the vapor deposition of separate sources of manganese and bismuth in a vacuum it has been found that one must provide extra manganese and that the initial manganese to bismuth weight ratio of the sources should be between 1:1.5 and 1:30.0 instead of the expected 1:3.8 to obtain the desired stoichiometry in the compound. A preferred weight ratio for the sources is about 1:2.25. Two possible reasons are tentatively advanced to explain this peculiarity. The first is that manganese can readily be oxidized during the deposition and growth procedure thereby reducing the total amount of available manganese for conversion into manganese bismuth. The second is that there are two unoccupied interstitial sites within each unit cell of manganese bismuth. Therefore, it is likely that manganese ions can fall into such sites. Indeed, this has ben found essential for the explanation of the conductivity mechanism in manganese bismuth.

Stoichiometry may also be detrimentally affected by the level of the vacuum used during the evaporation, deposition and heating of the binary constituents. It is preferred that a vacuum or pressure level between about $10^{-4}$ and about $10^{-7}$ mm. of Hg be maintained during evaporation, deposition and the subsequent heat treatment. At pressures above about $10^{-4}$ mm. of Hg, undesirable oxidation tends to occur and at pressures below about $10^{-7}$ mm. of Hg, undesirable evaporation and deterioration tends to occur either of which affects the quality of the final product.

Oxidation may create an undesirable problem at any time during deposition and the heat treatment. If the deposited binary constituents are extensively exposed to the ambient atmosphere, they tend to oxidize and the stoichiometric relationship deteriorates. Thus, it is preferred that the heat treatment take place in the same vacuum environment in which evaporation and deposition are carried out.

To obtain substantial areas of epitaxial manganese bismuth it is necessary to provide a substrate suitable for the single crystal growth of the compound during the heat treatment. The considerations which must be given the selection of a suitable substrate for this purpose are generally known to those of ordinary skill in the art. Specifically, a preferred substrate for epitaxial manganese bismuth is mica because of its hexagonal structure and because cleavage exposes clean, relatively perfect basal planes. Other layered silicates offer similar structures, but their cleavage is less perfect and presents more cleavage steps and tear markings which serve as stray nucleation sites. Other hexagonal materials such as corundum also may be used. If the epitaxial compound is not desired, other substrates used in the prior art, such as glass, may be used to obtain polycrystalline manganese bismuth in accordance with this invention.

The heat treatment conditions for forming the compound after deposition of the binary constituents are not critical so long as the temperature does not exceed the decomposition of the compound. Treatment at low temperatures and for short periods of time is preferred. A satisfactory range from a practical standpoint, particularly if the epitaxial compound is desired, has been found to be about 270° C. if the heat treatment is kept at about 68 hours or longer although the heat treatment according to the above noted Williams et al. article may also be used as far as temperatures and time are concerned. Extremely short periods of around 5 minutes have also been used successfully to prepare the compound when the binary constituents were rapidly heated from room temperature to a temperature of about 200° C. to about 400° C.

Films of about 200 A. to 3000 A. in thickness have been prepared with the above factors in mind and found to be oriented with the crystalline C-axis perpendicular to the substrate as desired for use in a magneto-optical memory or information storage element.

The following examples are representative of the preferred vapor deposition process in accordance with this invention. In the preparation of these examples, bismuth was deposited on the substrate followed by the deposition of the manganese over the bismuth. The sources were positioned about 46 cm. from the substrate during deposition. The substrate temperature was maintained at room temperature. Essentially the same vacuum established during deposition was maintained during the subsequent heat treatment. When mica is indicated as the substrate, the resultant compound is either single crystal or substantially single crystal.

TYPICAL EXAMPLES

| | 1 | 2 | 3 | 4 | 5 | 6 | 7 | 8 | 9 |
|---|---|---|---|---|---|---|---|---|---|
| Initial amount, mg.: | | | | | | | | | |
| Mn | 340 | 140 | 100 | 400 | 470 | 255 | 255 | 315 | 130 |
| Bi | 765 | 210 | 125 | 1,000 | 940 | 765 | 765 | 785 | 290 |
| Weight ratio, Mn: Bi | 1:2.25 | 1:1.5 | 1:1.25 | 1:2.5 | 1:2 | 1:3 | 1:3 | 1:2.5 | 1:2.25 |
| Substrate | (1) | (1) | (1) | (1) | (1) | (1) | (2) | (2) | (1) |
| Vacuum, mm. of Hg | $7\times10^{-7}$ | $2\times10^{-6}$ | $7\times10^{-7}$ | $8\times10^{-7}$ | $8\times10^{-7}$ | $4\times10^{-7}$ | $4\times10^{-7}$ | $2\times10^{-6}$ | $2\times10^{-6}$ |
| | $5\times10^{-6}$ | $3\times10^{-5}$ | $1\times10^{-5}$ | $1\times10^{-6}$ | $1\times10^{-5}$ | $1\times10^{-5}$ | $1\times10^{-5}$ | $2\times10^{-5}$ | $2\times10^{-6}$ |
| Time, hours | 68 | 68 | 68 | 68 | 68 | 68 | 68 | 72 | 65 |
| Heat treatment temp., ° C | 275 | 270 | 265 | 275 | 275 | 275 | 275 | 275 | 275 |

[1] Mica. [2] Glass.

Manganese bismuth prepared in accordance with this invention, including the above examples, has been found typically to possess improved magnetic and magneto-optic properties within the following ranges:

Coercive force $H_c$.—100–1500 oe.
Saturation field $H_s$.—3–5 koe.
Room temperature total faraday rotation 6328 A.—50′–40°

For protection against oxidation and hygroscopic reaction, the provision of a coating, such as silicon monoxide or quartz, for the compound has been found desirable. Examples 7, 11 and 13 were so protected without detrimentally affecting the optical properties of the film. The processing details for providing adherent silicon monoxide and quartz coatings are well known.

The embodiments of the invention in which an exclusive property or right is claimed are defined as follows:

[1. The process of preparing manganese bismuth comprising:
depositing bismuth on a substrate;
depositing manganese over the bismuth, and
heating the deposited manganese and bismuth to form the intermetallic manganese bismuth compound.]

[2. The process of claim 1 wherein the deposited manganese and bismuth is heated to a temperature between about 225° C. and about 400° C.]

[3. The process of claim 2 wherein the heating is maintained for about 68 hours.]

[4. The process of claim 1 wherein:
separate predetermined quantities of manganese and bismuth in a weight ratio of from 1:1.5 to 1:3.0 manganese to bismuth are introduced into a vacuum deposition chamber apparatus containing a substrate for deposition;
the chamber is evacuated to a suitable pressure level for vacuum deposition;
the substrate is maintained at a deposition temperature;
the bismuth is evaporated whereby it deposits on the substrate;
the manganese is evaporated whereby it deposits over the deposited bismuth, and
the deposited manganese and bismuth are heated to form the manganese bismuth.]

[5. The process of claim 4, wherein the substrate is a cleaved single crystal of mica.]

[6. The process of claim 4 wherein the heating step is carried out while substantially maintaining the vacuum environment established for the deposition of the manganese and bismuth.]

[7. The process of claim 4 wherein the quantities of manganese and bismuth have a weight ratio of about 1:2.25.]

[8. The process of claim 7 wherein the deposited manganese and bismuth is heated to a temperature between about 225° C. and about 400° C.]

*9. A process for producing reproducible, large area thin films of manganese bismuth having substantially uniform magnetic properties over the entire area of the thin film with the crystalline C axis oriented normal to the plane of the thin film and having improved magneto-optic properties, the process comprising:*

*depositing bismuth on a substrate;*

*depositing manganese over the bismuth, the amount of manganese being in excess of the 1 to 1 manganese to bismuth atomic ratio in stoichiometric manganese bismuth; and*

*heating the deposited manganese bismuth to form the intermetallic manganese bismuth compound.*

*10. The process of claim 9 wherein the deposited manganese and bismuth is heated to a temperature between about 225° C. and about 400° C.*

*11. The process of claim 10 wherein the heating is maintained for about 68 hours.*

*12. A process of preparing manganese bismuth comprising:*

*introducing separate predetermined quantities of manganese and bismuth in a weight ratio of from 1:1.5 to 1:3.0 manganese to bismuth into a vacuum deposition chamber apparatus containing a substrate for deposition,*

*evacuating the chamber to a suitable pressure level for vacuum deposition;*

*maintaining the substrate at a deposition temperature;*

*evaporating the bismuth whereby it deposits on the substrate;*

*evaporating the manganese whereby it deposits over the deposited bismuth; and*

*heating the deposited manganese and bismuth to form the intermetallic manganese bismuth compound.*

*13. The process of claim 12 wherein the substrate is a cleaved single crystal of mica.*

*14. The process of claim 12 wherein the heating step is carried out while substantially maintaining the vacuum environment established for the deposition of the manganese and bismuth.*

*15. The process of claim 12 wherein the quantities of manganese and bismuth have a weight ratio of about 1:2.25.*

*16. The process of claim 15 wherein the deposited manganese and bismuth is heated to a temperature between about 225° C. and about 400° C.*

References Cited

The following references, cited by the Examiner, are of record in the patented file of this patent or the original patent.

UNITED STATES PATENTS

| | | | |
|---|---|---|---|
| 2,576,679 | 11/1951 | Guillarn | 148—103 |
| 2,804,415 | 8/1957 | Boothby et al. | 148—103 |
| 2,825,670 | 3/1958 | Adams et al. | 148—103 |

OTHER REFERENCES

"Investigation of Electro- and Magneto-Optic Techniques for Information Storage and Retrieval," Technical Documentary Report No. Al-TDR-64-228, September 1964.

Holland: Vacuum Deposition of Thin Films, 1956, pp. 483–491.

Roberts: Physical Review, vol. 96, No. 6, December 1954, pp. 1494–1496.

Williams et al.: Journal of Applied Physics, vol. 28, No. 10, October 1957, pp. 1181–1184.

Dickson et al.: Phil. Mag., 1962, pp. 1315–1321.

LEON D. ROSDOL, Primary Examiner

H. A. PITLICK, Assistant Examiner

U.S. Cl. X.R.

117—107, 235